United States Patent
Kovach et al.

(10) Patent No.: US 8,087,471 B2
(45) Date of Patent: *Jan. 3, 2012

(54) AGRICULTURAL IMPLEMENT WITH IMPROVED TILLAGE POINT

(75) Inventors: Michael G. Kovach, Morton, IL (US); Martin Roberge, Saskatoon (CA); Robert Lee Armstrong, Washington, IL (US)

(73) Assignee: CNH Canada, Ltd. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/495,379

(22) Filed: Jun. 30, 2009

(65) Prior Publication Data

US 2010/0326682 A1  Dec. 30, 2010

(51) Int. Cl.
*A01B 39/20* (2006.01)
(52) U.S. Cl. ......... 172/730; 172/699; 172/724; 172/770
(58) Field of Classification Search ............... 172/156, 172/196, 681, 689, 699, 700, 718, 720–722, 172/724, 730, 765, 770, 771, 719, 772; 111/152, 111/124; D15/10, 11, 28, 29
See application file for complete search history.

(56) References Cited

U.S. PATENT DOCUMENTS

| | | | |
|---|---|---|---|
| 184,171 A | 11/1876 | Porter | |
| 869,834 A * | 10/1907 | Fooshe | 172/156 |
| 1,255,442 A | 2/1918 | Lawford | |
| 2,619,054 A | 11/1952 | Bell | |
| 3,170,421 A * | 2/1965 | Norris et al. | 111/148 |
| 3,171,500 A | 3/1965 | Dils, Jr. | |
| 3,180,431 A | 4/1965 | Launder et al. | |
| 3,268,012 A | 8/1966 | Ratkowski | |
| 4,245,706 A | 1/1981 | Dietrich, Sr. | |
| 4,538,689 A | 9/1985 | Dietrich, Sr. | |
| D285,691 S | 9/1986 | Johnson | |
| 4,679,635 A | 7/1987 | Fields | |
| 4,770,112 A | 9/1988 | Neumeyer | |
| 5,437,337 A | 8/1995 | Dietrich, Sr. | |
| 5,456,323 A * | 10/1995 | Hill | 172/721 |
| 5,499,684 A | 3/1996 | Stratton | |
| 5,499,686 A | 3/1996 | Parker | |
| 5,540,288 A | 7/1996 | Dietrich, Sr. | |
| 5,605,196 A | 2/1997 | Grimm et al. | |
| D411,546 S | 6/1999 | Chapman | |
| 6,012,534 A * | 1/2000 | Kovach et al. | 172/196 |
| D429,256 S * | 8/2000 | Zaun | D15/29 |
| D429,258 S | 8/2000 | Zaun | |
| 6,178,900 B1 * | 1/2001 | Dietrich, Sr. | 111/119 |

(Continued)

*Primary Examiner* — Robert Pezzuto
*Assistant Examiner* — Matthew D Troutman
(74) *Attorney, Agent, or Firm* — Rebecca Henkel; Sue Watson (57) ABSTRACT

An agricultural implement includes a framework configured to be towed behind a vehicle, and a plurality of shanks mounted to the framework and configured to engage the soil. A tillage point is mounted on each shank. Each shank tillage point includes a body having a top surface and a nose extending from the top surface. The tillage point also includes two wings each disposed on a lateral side of the body and extending laterally outward. In certain embodiments, a slope of the nose relative to a horizontal plane of movement of the tillage point through soil is greater than a slope of the top surface of the body. In further embodiments, the wings are configured to engage the soil at a shallower depth than the nose, and/or a tip of each wing is configured to engage the soil at a greater depth than a respective wing root. In yet further embodiments, the tillage point includes a boss positioned forward of openings configured to receive a fastener for coupling the tillage point to a shank.

11 Claims, 4 Drawing Sheets

U.S. PATENT DOCUMENTS

| | | |
|---|---|---|
| 6,276,462 B1 | 8/2001 | Dietrich, Sr. |
| 6,422,323 B1 | 7/2002 | Dietrich, Sr. |
| 6,443,237 B1 | 9/2002 | Myers et al. |
| 6,761,120 B2 * | 7/2004 | Kovach et al. ................ 111/140 |
| D505,137 S | 5/2005 | Steinlage et al. |
| D512,078 S | 11/2005 | Poutre |
| 7,104,341 B2 | 9/2006 | Steinlage et al. |
| 7,506,595 B2 | 3/2009 | Bergen |

* cited by examiner

AGRICULTURAL IMPLEMENT WITH IMPROVED TILLAGE POINT

BACKGROUND

The invention relates generally to agricultural implements, and more specifically, to an implement with an improved tillage point configured to provide a low draft, enable high-speed operation and produce a smooth soil surface.

A wide range of agricultural implements have been developed and are presently in use for tilling, cultivating, harvesting, and so forth. Tillage implements, for example, are commonly towed behind tractors and may cover wide swaths of ground which may include various types of residue. Such residue may include materials left in the field after the crop has been harvested. These residues typically include stalks and stubble, leaves and seed pods. Good management of field residues can increase efficiency of irrigation and control of erosion in the field.

Accordingly, tillers may include ground engaging tools, such as shanks and tillage points, configured to condition the soil for improved moisture distribution while reducing soil compaction from such sources as machine traffic, grazing cattle, and standing water. The points are typically replaceable, and various points may be mounted on the shanks, depending upon the field conditions and the desired results of the tilling operation. Unfortunately, pulling ground engaging tools through the soil demands significant of tractor power, fuel, and time. The greater power applied to the tillers, the more fuel is consumed to till a given field. In addition, due to the significant drag or draft associated with the current ground penetrating tools, tractor speeds may be limited, thereby increasing the time and expense associated with tillage operations. Therefore, it may be desirable to create a low draft tillage point that establishes a level soil surface having few clods.

BRIEF DESCRIPTION

The invention provides an agricultural implement with an improved tillage point configured to enable high-speed operation of the implement, while producing a smooth soil surface. Specifically, the tillage point includes a body having a top surface and a nose extending from the top surface. The tillage point also includes two wings each disposed on a respective lateral side of the body and extending laterally outward. In certain embodiments, a slope of the nose relative to a horizontal plane of movement of the tillage point through soil may be greater than a slope of the top surface of the body. In further embodiments, the nose may be substantially flat in a lateral direction. The combination of these features may serve to reduce drag by creating a turbulent flow of soil around the tillage point and directing soil away from the wings.

Furthermore, the wings may be configured to engage the soil at a shallower depth than the nose. In such a configuration, the nose may engage and fracture harder compacted soil (i.e., hardpan), while the wings lift and twist the looser soil, thereby burying residue and adding oxygen to the soil. In further embodiments, a tip of each wing may be configured to engage the soil at a greater depth than a respective wing root. This configuration may substantially reduce or eliminate soil compaction under the wings. In yet further embodiments, an angle of a leading edge of each wing with respect to the body may be less than an angle of a trailing edge with respect to the body. This wing arrangement may reduce soil turbulence above the wing, thereby providing a smoother soil surface. In certain embodiments, each wing may be angled downwardly with respect to the body about an axis perpendicular to the direction of travel. This configuration may enable each wing to provide a greater degree of soil fracture, thereby increasing soil oxygen content and enhancing root growth.

Finally, certain embodiments may include a boss positioned forward of openings configured to receive a fastener for coupling the tillage point to a shank. The boss may divert soil away from components of the fastener external to the body, thereby reducing wear on the fastener.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
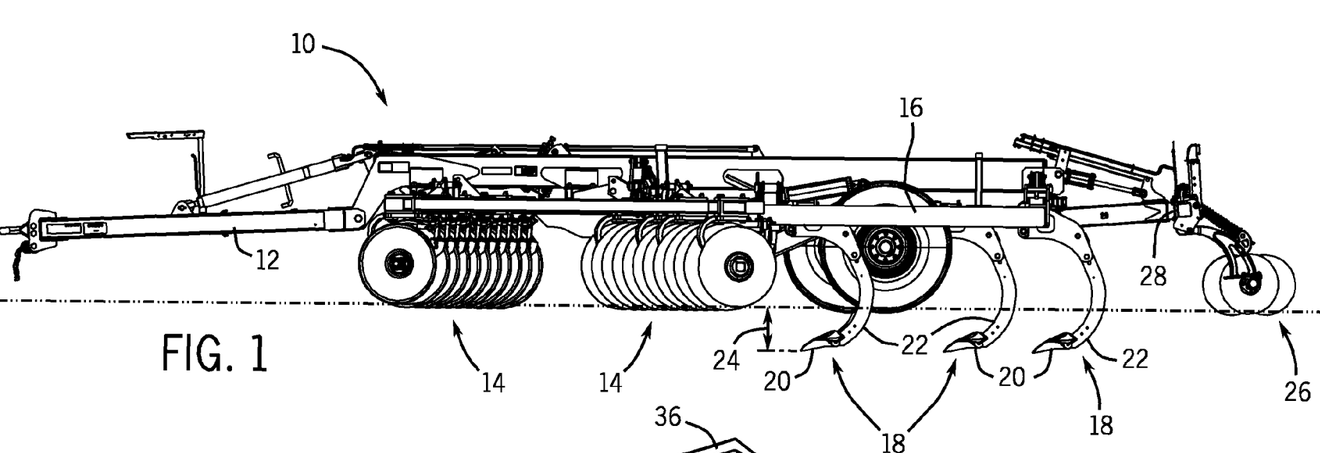
FIG. 1 is a side view of a tillage implement, including tillage points configured to enable high-speed operation of the tillage implement, while producing a smooth soil surface.

Turning now to the figures, FIG. 1 is a side view of an exemplary tillage implement 10. The tillage implement 10 may be used to till a field to prepare the soil by plowing, ripping, or turning. A portion of soil residue, such as plant stalks and/or weeds, may be removed during the tilling process. Further, the soil may be loosened and aerated, which in turn facilitates deeper penetration of roots. The tilling process may also help in the growth of microorganisms present in the soil and thus, maintain the fertility of the soil. As depicted, the tillage implement 10 includes a tow bar 12 having a coupling mechanism, such as a hitch, used to couple the implement 10 to a towing vehicle, such as a tractor. The tillage implement 10 also includes disk blades 14 coupled to a frame 16, which supports the blades 14, wheels, and other components of the tillage implement 10. The frame 16 may be formed of a durable, strong material, such as structural steel.

Multiple ground engaging tools 18 are also coupled to the frame 16. In certain embodiments, the ground engaging tools 18 may include plows, chisels, hoe openers, harrow tines, tillage points, or any combination thereof, or indeed any desired ground engaging tool. As depicted, the ground engaging tools 18 include tillage points 20 coupled to the frame 16 by shanks 22. The tillage points 20 may be configured to enable high-speed operation of the tillage implement 10, while producing a smooth soil surface. In the illustrated embodiment, the ground engaging tools 18 are positioned to till a field at a depth 24. In certain embodiments, the depth 24 of the tillage points 20 within the soil may be adjusted by raising or lowering the tools 18. For example, the depth 24 may be particularly adjusted based on local farming practices and/or field conditions. The depth 24 and arrangement of the tools 18 may create valleys and berms which may be smoothed out and leveled off by soil shaping disks 26. Specifically, a row of soil leveling disks 26 is disposed behind the ground engaging tools 18. The soil shaping disks 26 are each coupled to a tool bar 28 that extends from the frame 16. As depicted, the row of soil shaping disks 26 includes a plurality of disk assemblies disposed at different locations along the tool bar 28. The arrangement and spacing of the individual disk assemblies along the tool bar 28 improves a shape of the soil surface to improve germination while reducing soil compaction.

Figure 2:
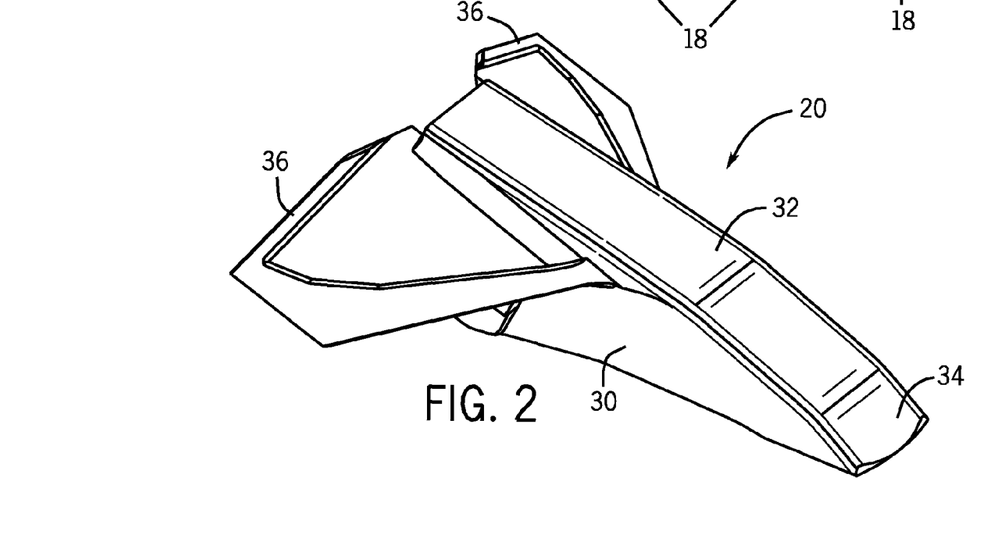
FIG. 2 is a perspective view of the tillage point shown in FIG. 1, including a nose having a steeper angle than the body, and wings configured to fracture the soil.

FIG. 2 is a perspective view of the tillage point 20, as shown in FIG. 1. The tillage point 20 includes a body 30 having a top surface 32 having at least one lateral edge 33, a nose 34 extending from the top surface 32, and wings 36 extending laterally from opposite lateral sides 37 of the body 30. The opposite lateral sides 37 each includes a lower edge 39. As discussed in detail below, the configuration of the nose 34 and/or the wings 36 may enable high-speed operation of the tillage implement 10, while producing a smooth soil surface. Specifically, in certain embodiments, an angle of the nose 34 with respect to a horizontal plane of movement of the tillage point 20 through the soil is greater than an angle of the top surface 32 relative to the horizontal plane. This configuration may reduce drag on the nose 34 and/or redirect soil away from the wings 36. In further embodiments, the nose 34 may be substantially flat in a lateral direction, thereby further reducing drag. Furthermore, the wings 36 may be configured to engage the soil at a shallower depth than the nose 34. In such a configuration, the nose 34 may engage and fracture harder compacted soil (i.e., hardpan), while the wings 36 lift and twist looser soil, thereby burying residue and adding oxygen to the soil. Because the wings 36 do not engage the hardpan, drag on the tillage point 20 may be reduced. In further embodiments, a tip of each wing 36 is configured to engage the soil at a greater depth than a respective wing root. This configuration may substantially reduce or eliminate soil compaction under the wings 36. In addition, deeper tip engagement may establish a suction force that maintains the tillage point 20 at a constant depth. In the illustrated embodiment, an angle of a leading edge of each wing 36 with respect to the body 30 is less than an angle of a trailing edge with respect to the body 30. This wing arrangement may reduce soil turbulence above the wing, thereby providing a smoother soil surface. Finally, each wing 36 is angled downwardly with respect to the body 30 about an axis perpendicular to the direction of travel. This configuration may enable each wing 36 to produce a greater degree of soil fracture, thereby increasing soil oxygen content and enhancing root growth.

Figure 3:
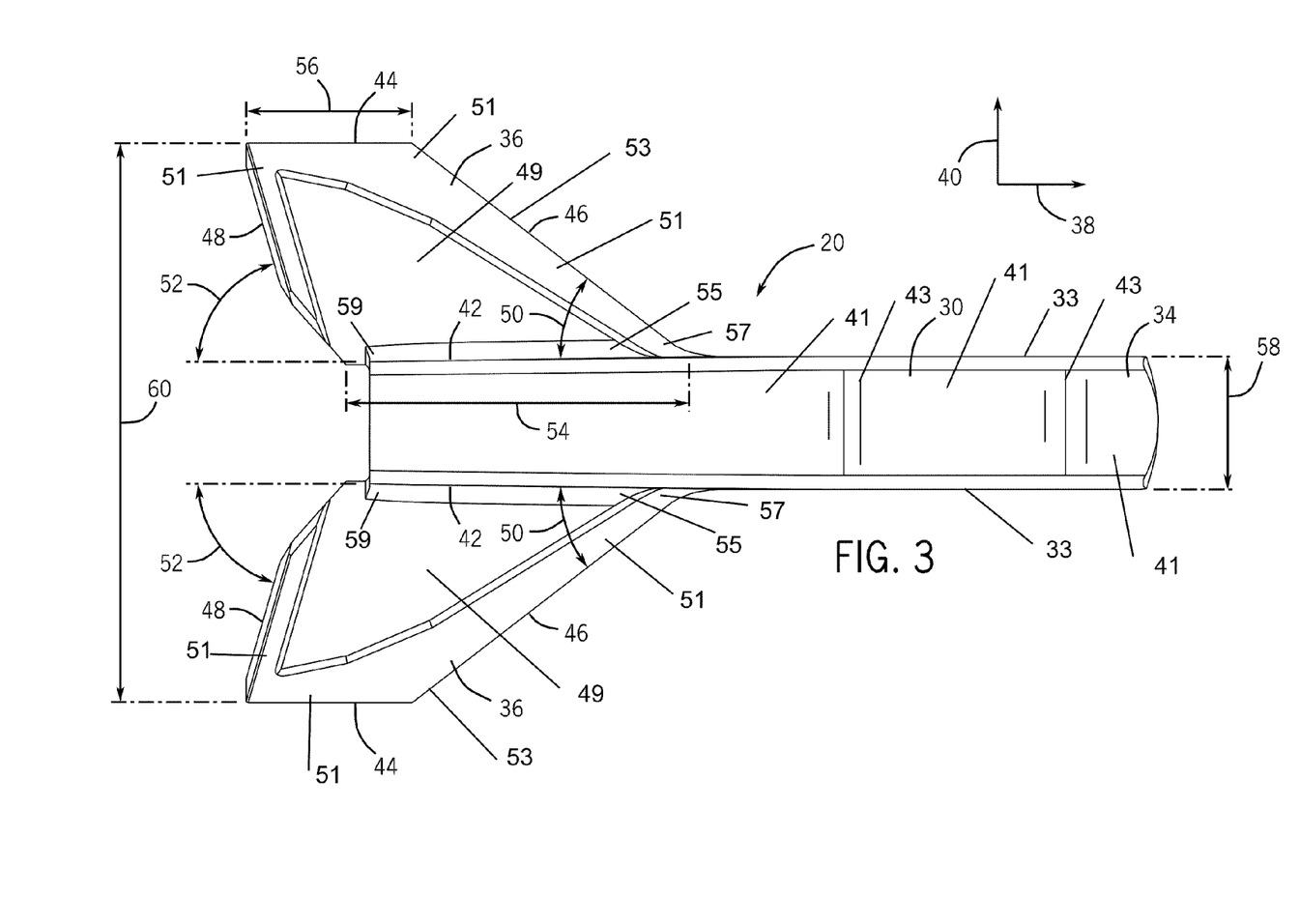
FIG. 3 is a top view of the tillage point shown in FIG. 2, showing a profile of each wing.

FIG. 3 is a top view of the tillage point 20 shown in FIG. 2, showing the profile of each wing 36. The tillage point 20 is configured to engage soil along a direction of travel 38, thereby fracturing the soil to provide additional oxygen and facilitate root growth. As illustrated, the wings 36 extend outwardly from the body 30 along an axis 40 perpendicular to the direction of travel 38. Each wing 36 includes a root 42 and a tip 44. The root 42 is disposed adjacent to the body 30 and serves to couple the wing 36 to the body 30. The tip 44 extends laterally outward from the root 42 along the axis 40. In certain embodiments, the body 30 and the wings 36 may be cast as a single piece. In alternative embodiments, the wings 36 may be coupled (e.g., welded, bonded, etc.) to the body 30 along the wing root 42. Each wing 36 also includes a leading edge 46, a trailing edge 48, and a wing body 49. As illustrated in both FIGS. 3 and 4, the wing 36 includes a lip 51 which extends substantially around an outer perimeter 53 of the wing 36 and the wing body 49. That is, the lip 51 extends about the leading edge 46, the tip 44 and a substantial portion of the trailing edge 48. The lip 51 is formed to be of a greater thickness than the wing body 49. Each wing root 42 includes a forward end 55 and each leading edge 46 includes a forward edge 57, each of which is positioned on one of the lateral sides 37 of the body 30 and a distance away from the edge 33 of the top surface 32. Each wing root 42 also includes a trailing end 59 which is positioned near at least a portion of the edge 33 of the top surface 32 such that the leading edge 46 of each wing 36 is positioned lower than the trailing edge 48 of the wing 36 relative to the top surface 32 of the tillage point 20. The forward end 55 of each wing root 42 and the forward edge 57 of each leading edge 46, while positioned a distance from the top surface 32, are still positioned closer to the top surface 32 than to the lower edge 39 of the lateral side 37. As the tillage point 20 moves along the direction of travel 38, the leading edge 46 engages and fractures the soil. The leading edge 46 is oriented at an angle 50 with respect to the body 30, while the trailing edge 48 is oriented at an angle 52 with respect to the body 30. In certain embodiments, the angle 50 of the leading edge 46 is smaller than the angle 52 of the trailing edge 48. For example, the angle 50 may be at least approximately between 0° to 60°, 10° to 50°, 20° to 40°, or about 30° less than the angle 52. Therefore, the leading edge 46 is not parallel to the trailing edge 48. Consequently, a chord length 54 of the wing root 42 is greater than a chord length 56 of the wing tip 44. For example, the chord length 56 may be at least approximately 10% to 90%, 20% to 70%, 30% to 50%, or about 40% of the chord length 54. This configuration results in a wing 36 having a reduced surface area compared to conventional parallelogram-shaped wings in which the angles of the leading edge and the trailing edge are substantially similar, and the chord lengths of the root and the tip are substantially similar. The wing geometry of the present embodiment may substantially reduce or eliminate displaced soil and clods from becoming lofted and emerging out of the soil, thereby resulting in a smoother soil surface having fewer clods.

Furthermore, as illustrated, a width 58 of the body 30 is approximately 20% of the width 60 of the tillage point 20. For example, in certain embodiments, the width 58 may be approximately 2 inches, while the width 60 is approximately 10 inches. Alternative embodiments may include different widths 58 and/or 60, and/or a different ratio between widths 58 and 60. In the present embodiment, both the nose 34 and the body 30 are substantially flat along the lateral axis 40, thereby providing a flat surfaces 41 which are interrupted by one or more, and in this embodiment, two convex bends 43. Therefore, when viewed in the lateral direction, at least one flat surface 41 is positioned on each side of each convex bend 43, as shown best in FIG. 4. This configuration may serve to redirect soil away from the wings 36, thereby reducing drag on the tillage point 20. As will be appreciated by those skilled in the art, tillage point drag may be proportional to the amount of soil encountered by the wings 36. Therefore, directing soil away from the wings 36 reduces drag and, consequently, reduces tractor power utilized to pull the tillage points 20 through the soil. As a result of this tillage point geometry, tractor fuel consumption may be reduced and/or the tillage implement 10 may be pulled faster through the field, thereby reducing farming costs. In addition, the flat nose 34 and top surface 32 may establish a turbulent flow of soil over the tillage point 20. The turbulent flow may serve to further reduce drag by substantially reducing or eliminating separated flow behind the tillage point 20 that may be formed by tillage points 20 configured to provide a laminar flow of soil over the nose 34 and top surface 32.

Figures 4, 5:
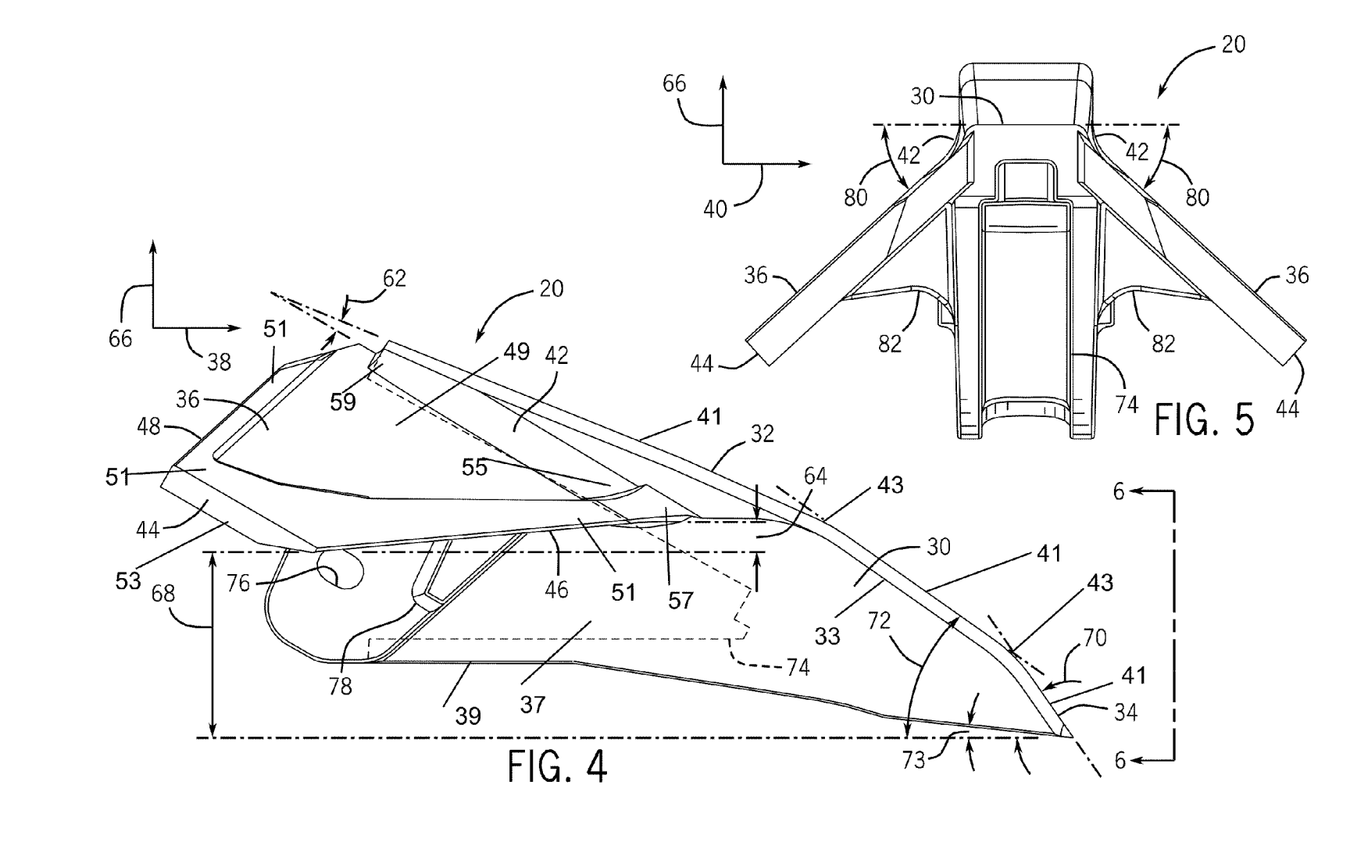
FIG. 4 is a side view of the tillage point shown in FIG. 2, oriented at a proper attitude for fracturing soil, and showing a profile of the nose and a boss positioned forward of a fastener opening.
FIG. 5 is a back view of the tillage point shown in FIG. 2, including wing support struts and a shank receptacle.

FIG. 4 is a side view of the tillage point 20 shown in FIG. 2, oriented at a proper attitude for fracturing soil, and showing a profile of the nose 34 and a boss positioned forward of a fastener opening. In addition, the illustrated embodiment includes a wing 36 angled downwardly with respect to the body 30 about the axis 40 perpendicular to the direction of travel 38. Specifically, the wing 36 forms an angle 62 relative to the top surface 32 of the body. In certain embodiments, the angle 62 may be at least approximately between 0° to 60°, 0° to 45°, 0° to 30°, 5° to 20°, 5° to 10°, or about 5°. As will be appreciated by those skilled in the art, the angle 62 may be reflective of the amount of work performed by the wing 36. In other words, the greater the angle 62, the larger the degree of soil fracture that may be achieved. However, the angle 62 is also related to the drag created by the tillage point 20. Therefore, the angle 62 of the wing 36 with respect to the top surface 32 of the body 30 may be particularly configured to establish a desired degree of soil fracture, while reducing drag on the tillage point 20. This configuration may both establish suitable soil conditions for crop growth and reduce fuel costs associated with pulling the tillage implement 10.

As illustrated, the wing tip 44 is configured to engage the soil at a greater depth than the wing root 42. Specifically, the tip of the leading edge 46 is positioned a distance 64 below the root of the leading edge 46 along a vertical axis 66. In certain embodiments, the distance 64 may be at least approximately between 0 to 6, 1 to 5, 2 to 4, or about 3 inches. Configurations in which the wing tip 44 engages the soil deeper than the root 42 may reduce soil compaction as the tillage point 20 moves along the direction of travel 38. Tillage points 20 having wings 36 with tips 44 positioned at the same depth or higher than the roots 42 may compact the soil underneath the wings 36. The compacted soil may decrease root growth because of the increased soil density. Sloping the tips 44 downwardly may enable the wings 36 to engage the soil while substantially reducing or eliminating compaction under the wings 36. In addition, this wing configuration may establish suction between the tillage point 20 and the soil such that the depth of the tillage point 20 remains substantially constant, thereby enabling the nose 34 to properly fracture the soil.

Furthermore, the present embodiment includes a nose 34 configured to engage the soil at a greater depth than the wing tips 44. Specifically, the nose 34 is positioned a distance 68 below the tip of the leading edge 46. In certain embodiments, the distance 68 may be at least approximately between 0 to 5, 1 to 4, 2 to 3, or about 2 inches. Configurations in which the nose 34 engages the soil at a greater depth than the wing tips 44 may reduce drag on the tillage point 20. Specifically, where soil includes a layer of hardpan below a layer of less compacted soil, the nose 34 may engage the hardpan, while the wings 36 engage the less compacted soil. This arrangement may reduce drag on the tillage point 20 because the wings 36 are not pulled through the dense hardpan. However, the nose 34 alone may sufficiently fracture the hardpan as the tillage point moves in the direction of travel 38. Therefore, the present embodiment may both facture the hardpan and reduce drag on the tillage point 20, thereby reducing fuel costs and enabling the tillage implement 10 to be pulled faster through the field. Furthermore, positioning the wing tips 44 the distance 68 above the nose 34 may enable the wings 36 to create a lifting and twisting force on the soil, thereby facilitating additional soil fracture, burying residue, and adding additional oxygen to the soil.

In addition, the illustrated embodiment includes a nose 34 having a steeper slope than the top surface 32 of the body 30. Specifically, the nose 34 forms an angle 70 with respect to a horizontal plane of movement of the tillage point 20 through the soil. The body 30 forms an angle 72 with respect to the horizontal plane. In the present embodiment, the angle 70 of the nose is greater than the angle 72 of the top surface 32 of the body 30. In certain embodiments, the angle 70 is at least approximately between 0° to 30°, 5° to 25°, 10° to 20°, or about 15° greater than the angle 72. Furthermore, as illustrated, the slope of the top surface 32 decreases with respect to the horizontal plane as the top surface 32 approaches a rear of the tillage point 20. While the slope change occurs at a discrete point in the illustrated embodiment, the slope may decrease continuously or in multiple discrete increments in alternative embodiments. The greater slope of the nose 34 may cause soil to be fractured and directed away from the sides of the body 30 and the wings 36. Because the wings 36 engage less soil, drag on the tillage point 20 may be reduced, thereby decreasing fuel consumed to pull the tillage implement 10 and/or increasing the speed at which the tillage implement 10 may be pulled. In addition, the increased slope of the nose 34 may create additional turbulence, thereby further reducing drag on the tillage point 20.

Furthermore, a bottom surface of the nose 34 forms an angle 73 with respect to the horizontal plane of movement. In certain embodiments, the angle 73 may be at least approximately between 0° to 30°, 0° to 25°, 0° to 20°, 5° to 15°, 5° to 10°, or about 5°. Establishing the angle 73 between the bottom surface and the horizontal plane of movement may substantially reduce or eliminate soil compaction under the tillage point 20. In addition, the angle 73 may serve to maintain the sharp point of the nose 34 as the tillage point 20 wears. Moreover, the illustrated geometry of the nose 34 may create a downward force on the tillage point 20, thereby maintaining the tillage point 20 at a constant depth during operation.

As previously discussed, the tillage point 20 may be driven through the soil by a shank 22 coupled to the tillage implement 10. The present embodiment includes a receptacle 74 configured to receive the shank 22. Contact between the shank 22 and the receptacle 74 induces the tillage point 20 to move through the soil in the direction of travel 38. The shank 22 may also be coupled to the tillage point 20 by a fastener such that the tillage point 20 remains connected to the shank 22 when not engaging soil (i.e., during transport). However, the fastener may not be configured to resist the driving load. Instead, the fastener passes through elongated openings 76 on each lateral side of the body 30 to secure the shank 22 to the tillage point 20. The elongated openings 76 enable movement of the fastener with respect to the tillage point 20 such that the driving load is borne by the receptacle 74. In certain configurations, the fastener may be a threaded bolt with a head. The head may be external to the body 30 on a first lateral side, while a threaded portion extends through the body 30, the shank 22, and the opening 76 on the other lateral side. A nut may then be secured to the threaded portion external to the body 30 to secure the shank 22 to the tillage point 20.

In this configuration, the head of the bolt may be external to the body 30 and positioned adjacent to a first opening 76, while the nut, and possibly a portion of the threaded shaft, may be external to the body 30 and positioned adjacent to a second opening 76. In conventional designs, during operation of the tillage point, soil may constantly impact the head of the bolt and the nut, thereby causing wear and increasing the difficultly of separating the tillage point 20 from the shank 22 during maintenance operations. Therefore, as illustrated, a boss 78 may be positioned forward of each opening 76 along the direction of travel 38. The boss 78 diverts the flow of soil around the portions of the fastener external to the body 30, thereby extending the operational life of the fastener, and facilitating removal of the point from the shank. In the present embodiment, the boss 78 extends along the lateral direction a greater distance than the lateral extent of the fastener. Alternative embodiments may employ various other boss configurations, such as linear or angled arrangements.

FIG. 5 is a back view of the tillage point 20 shown in FIG. 2, including wing support struts and the shank receptacle. As previously discussed, the tip 44 of each wing 36 is configured to engage the soil at a greater depth than the root 42. This wing configuration results in a downward slope of the wings 36, thereby establishing an angle 80 between the horizontal plane of movement of the tillage point 20 through the soil and each wing 36. In certain embodiments, the angle 80 may be approximately between 0° to 60°, 15° to 45°, 30° to 45°, or about 45°. The downward slope of the wings 36 may substantially reduce or eliminate compaction of the soil under the wings 36 and/or provide a suction force that maintains the tillage point 20 at a constant depth.

The illustrated embodiment includes wing struts 82 configured to support the wings 36. As will be appreciated by those skilled in the art, a substantial force may be applied to the leading edge of each wing 36 as the tillage point 20 moves along the direction of travel. Therefore, the wing struts 82 may be disposed between an inner surface of each wing 36 and an outer surface of the body 30. The wing struts 82 may serve to reinforce the wings 36, thereby increasing the useful life of the tillage point 20. Alternative embodiments may include additional struts positioned above or below the illustrated struts 82, and/or fore or aft of the struts 82.

FIG. 5 also illustrates the shank receptacle 74. As will be appreciated by those skilled in the art, the size and configuration of the receptacle 74 may be configured to interlock with the shank 22 to provide effective contact between the shank 22 and the tillage point 20 during operation. The features of the tillage point 20 described above may individually, or in the aggregate, enable high-speed operation of the tillage implement 10, while producing a smooth soil surface.

Figure 6:
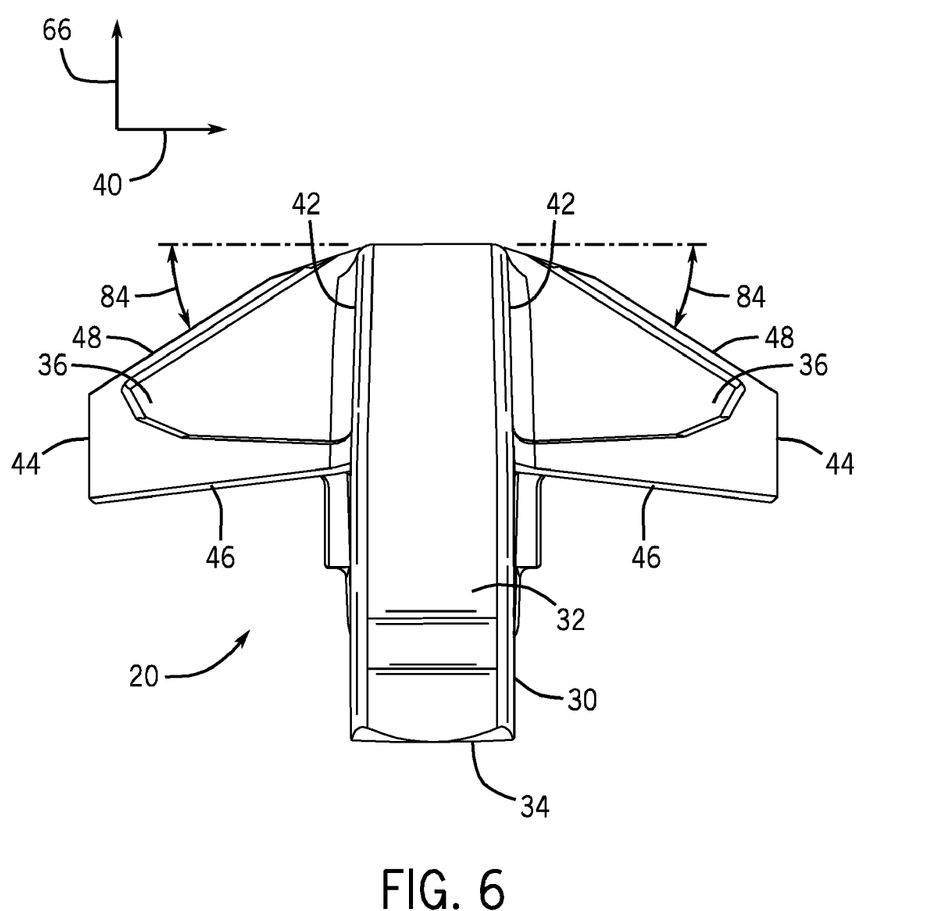
FIG. 6 is a front view of the tillage point, taken along line 6-6 of FIG. 4, further showing the profile of each wing.

FIG. 6 is a front view of the tillage point 20, taken along line 6-6 of FIG. 4, further showing the profile of each wing 36. As illustrated, the tillage point 20 is oriented at a proper attitude for fracturing soil. Therefore, FIG. 6 represents the front soil engaging profile of the top surface 32 and wings 36 as the tillage point 20 is driven through the soil. In the illustrated orientation, the struts 82 are positioned behind the wings 36. Consequently, the wings 36 divert soil away from the struts 82, thereby reducing drag on the tillage point 20 and substantially decreasing wear on the struts 82.

Furthermore, in the illustrated orientation, the trailing edge 48 of each wing 36 is sloped downwardly relative to a horizontal plane at an angle 84. In certain embodiments, the angle 84 may be at least approximately between 0° to 60°, 10° to 50°, 20° to 40°, or about 30°. The downward slope of the wings 36 may substantially reduce or eliminate displaced soil and clods from becoming lofted and emerging out of the soil, thereby resulting in a smoother soil surface having fewer clods. Similarly, the leading edge 46 of each wing 36 is angled with respect to the horizontal plane. This configuration may substantially reduce or eliminate plow sole, a condition in which repeated tillage produces hard compacted soil.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement comprising:
a tool framework configured to be towed behind a vehicle;
a plurality of shanks mounted to the tool framework and configured to engage the soil; and
a plurality of tillage points, each tillage point coupled to a respective shank and comprising:
a body including a top surface sloped relative to a horizontal plane of movement of the tillage point through soil, the slope of the top surface decreasing with respect to the horizontal plane as the top surface approaches a rear of the tillage point, wherein the body includes opposite lateral sides configured to extend downward from each edge of the top surface, each lateral side formed to include a lower edge;
a nose extending from and including at least a portion of the top surface, the nose sloped a greater amount relative to the horizontal plane than the body, wherein the top surface is substantially flat along the lateral direction, and wherein the top surface has at least one convex bend therein such that a flat surface is positioned on each longitudinal side of the at least one convex bend; and
a first wing disposed on a first lateral side of the body, and a second wing disposed on a second lateral side of the body, opposite the first lateral side, wherein each wing comprises a wing root disposed adjacent to the body, a tip extending laterally outward from the wing root, a leading edge, a trailing edge, and a wing body positioned substantially between the wing root, the tip, the leading edge and the trailing edge, wherein a trailing end of each wing root is positioned proximate to the top surface, and a forward end of each wing root is positioned downwardly from the trailing end along a respective lateral side, each wing includes a lip configured to extend along an outer perimeter of the leading edge, the tip and a substantial portion of the trailing edge of the wing, and the lip has a greater thickness than the wing body.

2. The implement of claim 1, wherein the nose is configured to have at least two convex bends.

3. The implement of claim 1, wherein the leading edge of each wing is positioned lower than the trailing edge of the wing relative to the top surface of the tillage point.

4. The implement of claim 1, wherein the forward end of each wing root and the forward edge of each leading edge are positioned closer to the top surface than to the lower edge of the tillage point.

5. The implement of claim 1, comprising a receptacle in the body configured to receive a shank, wherein the tillage point is driven to translate in a direction of travel by contact between the shank and the receptacle.

6. The implement of claim 5, comprising an opening in each lateral side of the body to facilitate securing the tillage point to the shank with a fastener, wherein a boss is positioned forward of each opening in the direction of travel to divert soil around a portion of the fastener external to the body.

7. An agricultural implement comprising:
a tool framework configured to be towed behind a vehicle;
a plurality of shanks mounted to the tool framework and configured to engage soil; and
a plurality of tillage points, each tillage point coupled to a respective shank and comprising:

a body including a top surface configured to engage soil along a direction of travel, wherein the body includes opposite lateral sides configured to extend downward from each edge of the top surface, each lateral side formed to include a lower edge, a nose extending from and including at least a portion of the top surface, wherein the nose comprises a substantially rectangular surface configured to engage soil along the direction of travel, wherein the top surface is substantially flat along a lateral direction, the nose is sloped a greater amount relative to a horizontal plane than the body, the top surface of has more than one convex bend therein, and a flat surface is positioned on each longitudinal side of each convex bend, a first wing disposed on a first lateral side of the body, and a second wing disposed on a second lateral side of the body, opposite the first lateral side, wherein each wing is angled downwardly with respect to the body about an axis perpendicular to the direction of travel, and each wing comprises a wing root disposed adjacent to the body, a tip extending laterally outward from the wing root, a leading edge, a trailing edge, and a wing body positioned substantially between the wing root, the tip, the leading edge and the trailing edge, wherein a trailing end of each wing root is positioned proximate to the top surface, and a forward end of each wing root is positioned downwardly from the trailing end along a respective lateral side wherein each wing includes a lip extending along a substantial portion of an outer perimeter of each wing, the lip formed to have a greater thickness than the wing body, and wherein the tip is configured to engage the soil at a greater depth than the wing root and at a shallower depth than the nose, and an angle of the leading edge of the wing is less than an angle of the trailing edge of the wing with respect to the body.

8. The implement of claim 7, wherein the angle of the leading edge with respect to the body is at least approximately 30 degrees less than the angle of the trailing edge with respect to the body.

9. The implement of claim 8, wherein the substantial portion of the outer perimeter of each wing includes the leading edge, the tip and a substantial portion of the trailing edge.

10. The implement of claim 7, comprising two struts each extending laterally outward from the body and coupling to a respective wing, and wherein each strut is disposed behind the respective wing along the direction of travel, and wherein each wing is configured to divert soil around the respective strut.

11. The implement of claim 7, comprising an opening in each lateral side of the body to facilitate securing the tillage point to a shank with a fastener, wherein a boss is positioned forward of each opening in the direction of travel to divert soil around a portion of the fastener external to the body.

\* \* \* \* \*